(12) United States Patent
Christian et al.

(10) Patent No.: US 7,227,983 B1
(45) Date of Patent: Jun. 5, 2007

(54) AUTOMATED MACROMOLECULAR CRYSTAL DETECTION SYSTEM AND METHOD

(75) Inventors: Allen T. Christian, Tracy, CA (US); Brent Segelke, San Ramon, CA (US); Bernard Rupp, Livermore, CA (US); Dominique Toppani, Fontainebleau (FR)

(73) Assignee: The Regents of the University of California, Oakland, CA (US)

( * ) Notice: Subject to any disclaimer, the term of this patent is extended or adjusted under 35 U.S.C. 154(b) by 874 days.

(21) Appl. No.: 10/452,668

(22) Filed: May 30, 2003

Related U.S. Application Data

(60) Provisional application No. 60/385,210, filed on May 30, 2002.

(51) Int. Cl.
*G06K 9/00* (2006.01)
*G01N 23/207* (2006.01)

(52) U.S. Cl. .................. 382/141; 382/199; 378/73; 702/19

(58) Field of Classification Search ............. 382/133, 382/141, 199; 378/73; 702/19
See application file for complete search history.

(56) References Cited

U.S. PATENT DOCUMENTS

| | | | |
|---|---|---|---|
| 5,077,767 A * | | 12/1991 | Gaukroger .................. 378/73 |
| 5,138,179 A * | | 8/1992 | Baba et al. .................. 117/15 |
| 5,378,900 A * | | 1/1995 | Hirano et al. ............... 117/201 |
| 5,544,254 A * | | 8/1996 | Hartley et al. .............. 382/108 |
| 5,846,318 A * | | 12/1998 | Javidi ......................... 117/14 |
| 5,978,444 A * | | 11/1999 | Atac et al. ................... 378/73 |
| 6,171,391 B1 * | | 1/2001 | Fuerhoff et al. ............. 117/14 |
| 6,404,849 B1 * | | 6/2002 | Olson et al. ................. 378/79 |
| 6,548,811 B1 * | | 4/2003 | Nakamura et al. .......... 250/311 |
| 6,985,616 B2 * | | 1/2006 | Ganz et al. ................. 382/133 |
| 7,118,626 B2 * | | 10/2006 | Ng et al. ..................... 117/68 |
| 2002/0126802 A1 * | | 9/2002 | Olson et al. ................ 378/208 |
| 2003/0048341 A1 * | | 3/2003 | Mutz et al. ................. 347/100 |
| 2004/0013231 A1 * | | 1/2004 | He et al. ..................... 378/73 |
| 2004/0153256 A1 * | | 8/2004 | Woods ....................... 702/27 |
| 2004/0218798 A1 * | | 11/2004 | Abdel-Fattah et al. ...... 382/133 |
| 2004/0258203 A1 * | | 12/2004 | Yamano et al. .............. 378/73 |
| 2006/0207066 A1 * | | 9/2006 | Segelke et al. ........... 23/295 R |
| 2006/0222220 A1 * | | 10/2006 | Yamano et al. ............ 382/128 |

\* cited by examiner

*Primary Examiner*—Bhavesh M Mehta
*Assistant Examiner*—Aaron Carter
(74) *Attorney, Agent, or Firm*—James S. Tak; John H. Lee

(57) ABSTRACT

An automated macromolecular method and system for detecting crystals in two-dimensional images, such as light microscopy images obtained from an array of crystallization screens. Edges are detected from the images by identifying local maxima of a phase congruency-based function associated with each image. The detected edges are segmented into discrete line segments, which are subsequently geometrically evaluated with respect to each other to identify any crystal-like qualities such as, for example, parallel lines, facing each other, similarity in length, and relative proximity. And from the evaluation a determination is made as to whether crystals are present in each image.

34 Claims, 8 Drawing Sheets

AUTOMATED MACROMOLECULAR CRYSTAL DETECTION SYSTEM AND METHOD

This application claims priority in provisional application filed on May 30, 2002, entitled "Augmented Automated Macromolecular Crystal Detection from Light Microscopy Images" Ser. No. 60/385,210, by inventors Christian et al.

I. CLAIM OF PRIORITY IN PROVISIONAL APPLICATION

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to automated image recognition and detection systems and methods, and more particularly to an automated system and method using a phase-based edge detection process to detect macromolecular crystals from two-dimensional images obtained from light microscopy of crystallization experiments.

III. BACKGROUND OF THE INVENTION

Proteomics is the field of bioscience involving the characterization of the proteins encoded by the human genome, and enabled by the gene sequence data produced by the human genome project. Since the structure of a protein is key to understanding its function, one field of proteomics in particular has rapidly emerged concerning high throughput structure determination or structural genomics. In determining protein structure, the proteins are first crystallized, and then an X-ray generator produces diffraction patterns from which a three-dimensional picture of the atomic arrangement in the crystal can be obtained. Advances in macromolecular crystallography techniques, computer speed, and the availability of high-energy synchrotron x-ray sources, make rapid structure determination possible given adequate quality protein crystals.

Crystal growth, however, is difficult because proteins are large, irregularly shaped molecules that do not readily come together in a repeating pattern, and the complete set of crystallization conditions is too large and impractical to screen comprehensively. Thus, previously uncrystallized proteins must be screened on a trial and error basis against a large array of conditions that have the potential to induce crystal formation. Automated methods using, for example, robotic liquid handling devices, robotic CCD-based microscope cameras, or light microscopes equipped with robotic stages and CCD cameras, have been developed and are commercially available to speed up the process of setting up and recording the results (automated image capture) of a large number of crystallization trials. However, a practical problem remains in that each experiment must still be visually inspected to determine successful crystal formation. In fact, the high throughput enabled by the automation in setup and image-capture has increased the visual inspection bottleneck, which is typically performed manually by human intervention.

One example of an automated crystal detection method developed to address the visual inspection bottleneck is disclosed in the article "Intelligent Decision Support for Protein Crystal Growth" (by Jurisica et al, IBM Systems Journal, Vol. 40, No. 2, 2001). In that article, and as shown in FIGS. 3–7 thereof, images of screening results are analyzed using a two-dimensional Fourier transform. In particular, FIG. 5C illustrates the Fourier frequency spectrum used in the analysis, and FIG. 5D illustrates an analysis of the spectrum derivatives and circular averages to provide features information of the image. From this feature extraction and analysis, the outcome of the experiment is classified as, clear drop, amorphous precipitate, phase separation, microcrystals, crystals, or unknown.

Despite such efforts, difficulties in automating (i.e. without human intervention) crystal detection remain due to such factors as poor image quality due to noise and low contrast, differences in crystal shapes, poorly formed crystals, etc. With respect to poor image quality, crystals may have less contrast relative to the background than other objects or particles. For example, the difference between the crystal and the background based on 256 gray levels is often 15 levels, whereas the difference for dirt is usually above 40 levels. Additionally, many different crystal shapes exist due to, for example, the existence of several large classes of crystal shape, the picture is a 2-D projection of a 3-D object, crystal imperfections with faulty edges, and large variations in crystal size, e.g. ranging from about 10 µm to nearly 300 µm. There are also many things on the picture that are not real crystals, such as dirt, precipitation, quasi-crystals, small drop due to condensation, and unidentified effects. Additionally, an automated crystal detection process must also achieve a high threshold of accuracy by being able to identify virtually all crystals with a low false-positive rate.

Thus in summary, there is a need for an automated crystal detection method and system for inspecting two-dimensional images and successfully detecting crystals therefrom. An automated solution for crystal detection, such as implemented by a software program, would be a great labor savor by possessing the capability of processing thousands of images a day and provide analysis substantially free from false positives.

IV. SUMMARY OF THE INVENTION

One aspect of the present invention includes a method of detecting macromolecular crystals in light microscopy images comprising: detecting edges in said images by identifying local maxima of a phase congruency-related function associated with each image; segmenting the detected edges into discrete line segments; evaluating the geometric relationships that the line segments have with each other to identify any crystal-like qualities; and determining the presence of crystals in each image based on said evaluation.

Another aspect of the present invention includes a computerized system for detecting macromolecular crystals from light microscopy images comprising: a digital conversion component that converts said light microscopy images into corresponding phase-based digital image data using the Fourier transform; an edge detection component that detects edges from the image data by computing local maxima of a phase congruency-related function associated with each image; a segmentation component that divides the detected edges into discrete line segments; and a geometric analyzer component that evaluates the geometric relationships that the line segments have with each other to identify any crystal-like qualities, and determines whether crystals are present in each image based on said evaluation.

Another aspect of the present invention includes a computerized system for detecting macromolecular crystals from light microscopy images comprising: means for digitally converting said light microscopy images into corresponding phase-based digital image data using the Fourier transform; means for detecting edges from the image data by computing local maxima of a phase congruency-related function associated with each image; means for dividing the detected edges into discrete line segments; means for evaluating the geometric relationships that the line segments have with each other to identify any crystal-like qualities; and means for determining the presence of crystals in an image from said evaluation.

Another aspect of the present invention includes a computer program product comprising: a computer useable medium having a computer readable code embodied therein for causing the detection of macromolecular crystals in light microscopy images, said computer program product having: computer readable program code means for causing a computer to detect edges in said images by identifying local maxima of a phase congruency-related function associated with each image; computer readable program code means for causing said computer to segment the detected edges into discrete line segments; computer readable program code means for causing said computer to evaluate the geometric relationships that the line segments have with each other to identify any crystal-like qualities; and computer readable program code means for causing said computer to determine the presence of crystals in each image based on said evaluation.

Another aspect of the present invention includes an article of manufacture comprising: a computer useable medium having a computer readable code means embodied therein for causing the detection of macromolecular crystals in light microscopy images, said computer readable code means in said article of manufacture comprising: computer readable program code means for causing a computer to detect edges in said images by identifying local maxima of a phase congruency-related function associated with each image; computer readable program code means for causing said computer to segment the detected edges into discrete line segments; computer readable program code means for causing said computer to evaluate the geometric relationships that the line segments have with each other to identify any crystal-like qualities; and computer readable program code means for causing said computer to determine the presence of crystals in each image based on said evaluation.

And another aspect of the present invention includes a program storage device readable by a machine, tangibly embodying a program of instructions executable by the machine to perform method steps for detecting macromolecular crystals from light microscopy images, said method steps comprising: detecting edges in said images by identifying local maxima of a phase congruency-related function associated with each image; segmenting the detected edges into discrete line segments; evaluating the geometric relationships that the line segments have with each other to identify any crystal-like qualities; and determining the presence of crystals in each image based on said evaluation.

V. BRIEF DESCRIPTION OF THE DRAWINGS

The accompanying drawings, which are incorporated into and form a part of the disclosure, are as follows.

VI. DETAILED DESCRIPTION

The present invention is an automated method and system (hereinafter "method") for detecting the presence of macromolecular crystals from light microscopy images, such as those obtained from crystallography experiments. Generally, the automated method utilizes the phase information of the pixels in each image in performing crystal detection. This provides greater resistance to noise and other artifacts than amplitude based properties, e.g. pixel intensity, which can lead to poor image quality. And in particular, the phase information of the pixels is used to identify specific geometric features in an image attributable to and most likely indicative of a crystalline structure, such as, for example, parallel edges, of similar length, facing each other, in relatively close proximity. Evaluation of detected geometries in this manner makes possible a low rate of false-positive detections and an effective resolution to the visual inspection bottleneck discussed in the Background caused by manual inspections. It is notable that the term "automated" suggests the absence of human intervention, although oversight of detection performance may still be present.

Implementation of the present invention is suitably achieved using, for example, software, computer code, ROM, integrated circuit, etc. (hereinafter "software") to execute and control the method steps and system functions. It is appreciated that the software may be written in any suitable programming language for operation on a suitable operating system or platform, not limited to any particular language or operating system or platform. For example, the software may be written as object oriented code having implementable subroutines that enable the user to call them in sequence to solve problems.

Figure 1:
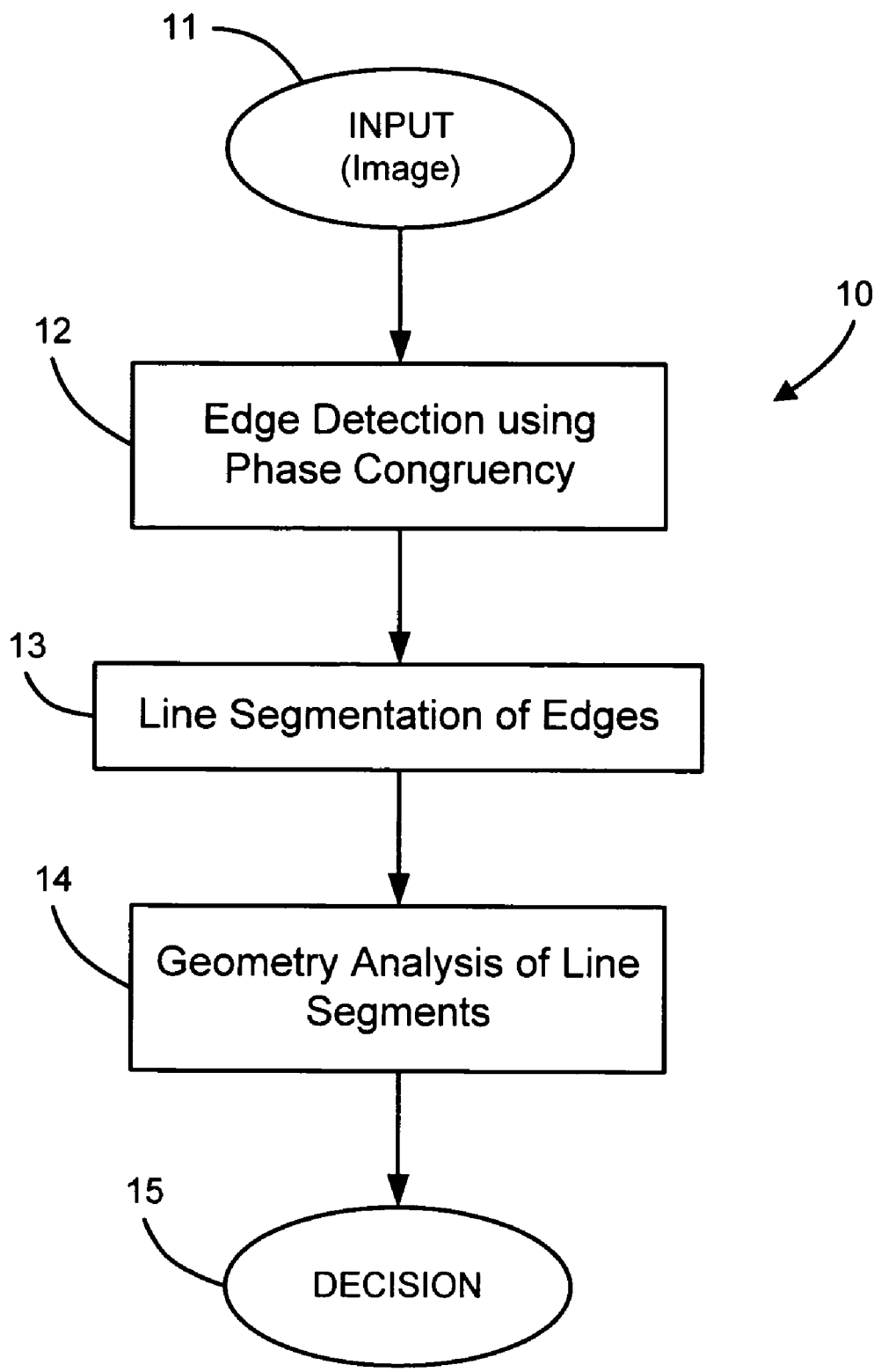
FIG. 1 is an overview flow diagram of a general embodiment of the present invention.

Turning now to the figures, FIG. 1 shows an overview flow diagram of the steps involved in a first general embodiment of the present invention, indicated at reference character 10. Two-dimensional images captured from crystallography experiments are first provided as input 11 to begin the process. At reference character 12, edge features, if any, in each image are detected using phase congruency, and in particular, a phase congruency-based function. The detected edges are then segmented into discrete, straight line segments in the line segmentation step of 13, followed by a geometric analysis and evaluation (hereinafter "evaluation") of the geometric relationships that the line segments have with each other to identify any crystal-like qualities, at 14. In particular, geometric relationships, such as parallel lines, facing each other, and similarity in length, as well as relative proximity to each other, are all crystal-like qualities in that they are characteristic of crystalline structure. And finally at 15, a determination and decision is made based on the preceding geometric evaluation, as to whether crystals are present in a particular image. A decision with respect to any one image may be reported separately, or together in a list with other images determined to have detected crystals. The corresponding ones of the experiments may subsequently be collected for X-ray determination of atomic structure and protein identification.

Figure 5:
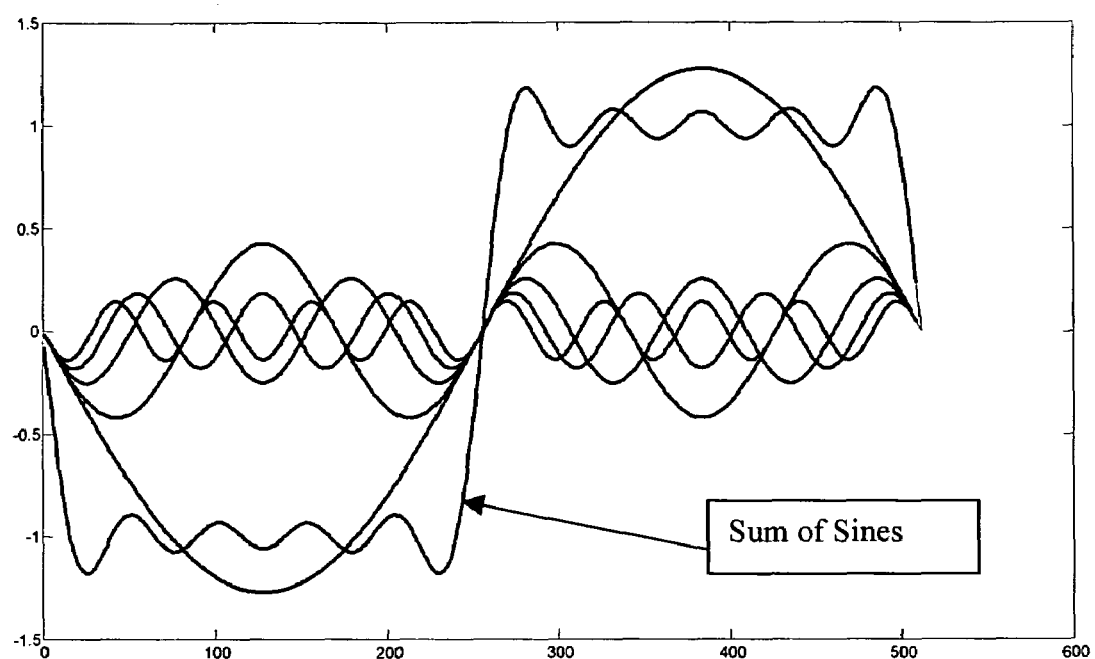
FIG. 5 is a graph of a 1-D step signal and its cosine decomposition via the Fourier transform.

Generally, the edge detection stage 12 uses the phase of the Fourier transform of the image to find the images. Taking, for example, a 1-D step signal (representing the equivalent of an edge) and its cosine decomposition shown in FIG. 5, the phases of all cosines are equal to zero only at the edge location, while everywhere else, the phases have different values. Since the phases of real signals are never actually equal, phase congruency or repartition is a method for measuring how much the phases of all the cosines are equal, with an edge corresponding to a local maximum of the phase congruency. It is preferred to compute the standard deviation of the cosine of the phases since computing the standard deviation of the phases at each point can give wrong results for the simple reason that $0=2\pi$. The phase congruency function for a 1-D continuous signal is therefore defined as:

$$PC(x) = \max_{\theta \in [0, 2\pi]} \frac{\int a_\omega \cos(\omega x + \Phi_\omega - \theta) d\omega}{\int a_\omega d\omega} \quad (1)$$

where $\alpha_\omega$ and $\Phi_\omega$ are respectively the amplitude and phase of the signal. Thus identifying the local maxima of the phase congruency function will also identify and thereby detect the edges. It is notable, however, that while this function provides the correct computational results, it is slow to compute directly.

In the alternative, the same result can be obtained using local energy, and Gabor filters which are similar in function to those present in the human brain for image perception and vision. The local energy of a 1-D signal is defined as:

$$LE(x) = \sqrt{I^2(x) + H^2(x)} \quad (2)$$

where I(x) is the 1-D signal, and H(x) is the Hilbert transform of I (i.e. ninety degree phase shift of I(x) in the frequency domain). Given the cosine decomposition of I(x) is:

$$\int \alpha_\omega \cos(\omega x + \Phi_\omega) d\omega \quad (3)$$

then H(x) has the decomposition:

$$-\int \alpha_\omega \sin(\omega x + \Phi_\omega) d\omega \quad (4)$$

I(x) is obtained by convolving the original signal by a filter to remove the DC component. And H(x) is obtained by filtering the previous result by the Hilbert transform of the first filter. The human visual system has neuronal structures similar to a pair of odd and even symmetric filters in quadrature. If $M_e$ is the even filter and $M_o$ is the odd filter, one has:

$$M_e * f(x) \approx \int_{-\infty}^{+\infty} a_\omega \cos(\omega x + \Phi_\omega) d\omega \quad (5)$$

and $$M_o * f(x) \approx -\int_{-\infty}^{+\infty} a_\omega \sin(\omega x + \Phi_\omega) d\omega \quad (6)$$

The even symmetric filter is chosen so that it covers as much of the frequency spectrum as possible, and at the same time removing the D.C. term. Since it is nearly impossible to have such a perfect filter, the approximate equal sign is used in Equations (5) and (6) above. The odd filter is the $\pi/2$ phase shift even one. In the real implementation, the filters are band-pass filters and different local energies are computed for different scale. This allows for a multi-scale analysis of the image to be performed, with the possibility to look for features of different size, and for example getting rid of noise or features very small that cannot be crystal.

The phase congruency function and the local energy function are related by:

$$LE(x) = \left\| \left( \int_{-\infty}^{+\infty} a_\omega \cos(\omega x + \Phi_\omega) d\omega, \right. \right. \quad (7)$$
$$\left. - \int_{-\infty}^{+\infty} a_\omega \sin(\omega x + \Phi_\omega) d\omega \right\|$$
$$= \max_{\theta \in [0, 2\pi]} \left( \int_{-\infty}^{+\infty} a_\omega \cos(\omega x + \Phi_\omega) d\omega, \right.$$
$$\left. - \int_{-\infty}^{+\infty} a_\omega \sin(\omega x + \Phi_\omega) d\omega \right) \cdot (\cos\theta, -\sin\theta)$$
$$= \max_{\theta \in [0, 2\pi]} \int_{-\infty}^{+\infty} a_\omega (\cos(\omega x + \Phi_\omega) \cos\theta +$$
$$\sin(\omega x + \Phi_\omega) \sin\theta) d\omega$$
$$= \max_{\theta \in [0, 2\pi]} \int_{-\infty}^{+\infty} a_\omega (\cos(\omega x + \Phi_\omega - \theta) d\omega$$

$$LE(x) = \int a_\omega d\omega \cdot PC(x) \quad (8)$$

As used herein and in the claims, the term "phase congruency-based function" is used to describe both the phase congruency function PC(x) as well as the local energy function LE(x). A local maximum in the local energy corresponds to a local maximum in the phase congruency, and to an edge. Therefore, in order to search for local maxima in the phase congruency function, one equivalently searches for local maxima in the local energy function. These local maxima will occur at step edges of both parity (up or down), lines and bar edges, and other types of features such as the illusion patterns mentioned before. While the previous calculations for both PC(x) and I(x) were for 1-D signals, it is appreciated that a 2-D signal can also be decomposed in a series of 1-D signals by traversing and accounting for many orientations. The local energy of a point will be the maximum local energy among all the orientations.

Figure 2:
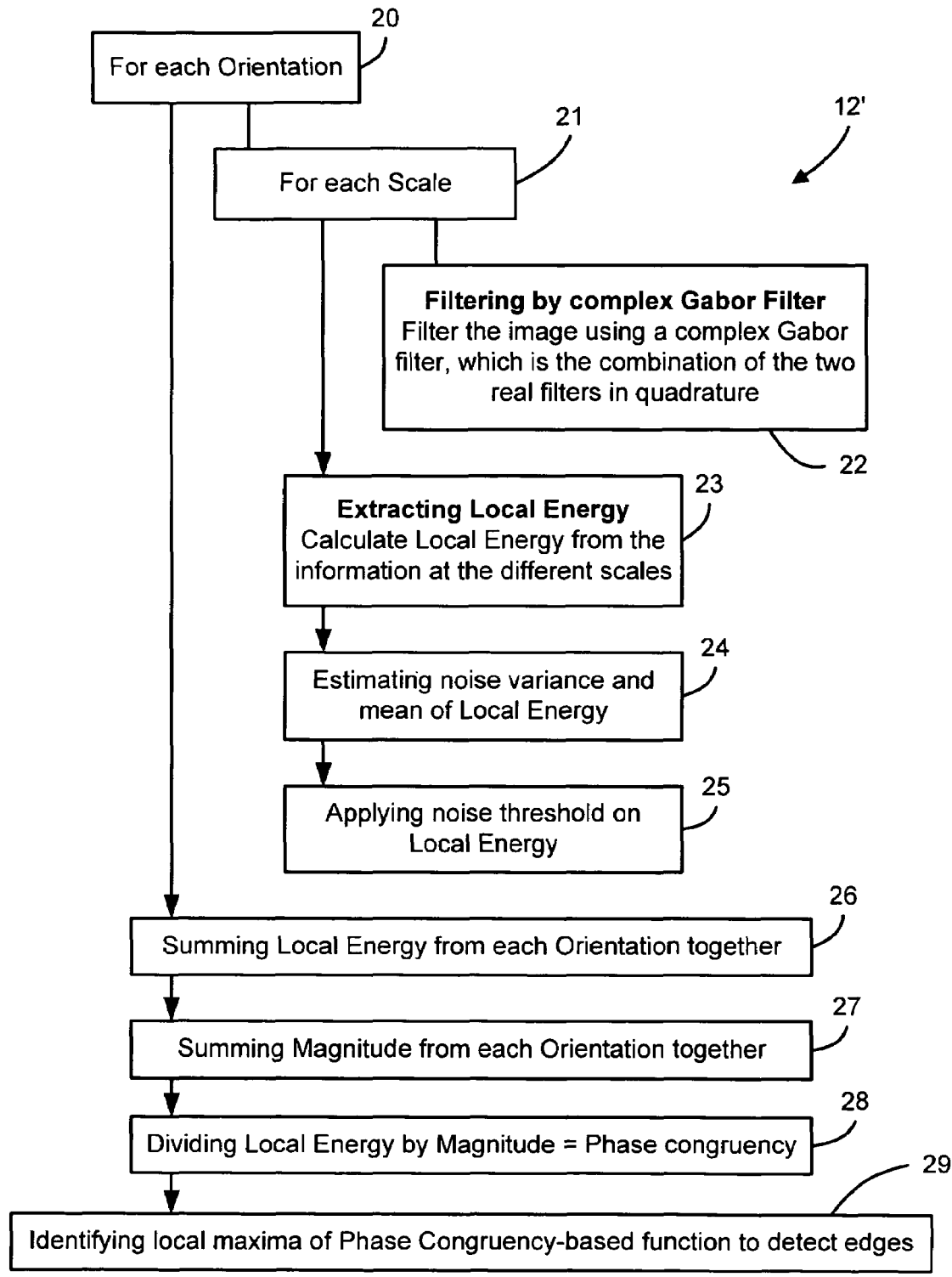
FIG. 2 is a flow diagram detailing an exemplary edge detection process using phase congruency, and including a noise reduction subprocess.

FIG. 2 shows a detailed flow diagram, indicated at reference character 12', of an exemplary edge detection step using a phase congruency-based function (e.g. local energy function) associated with an image. As indicated at reference character 20, and as discussed above, multiple orientations are considered. For each orientation and each scale at 21, a Gabor filter 22 is used to filter the image. The objective of this filtering step is to convert the spatial information in another space representation where the noise will be present everywhere, and the information will be more localized, so that the noise and information can be separated, and converted back to the normal space. Gabor filters are used since they closely approximate the human visual system, as previously discussed. They are the combination of the two real filters in quadrature, and are the result of a sine wave modulated by a Gaussian function as in:

$$g(x, y) = \frac{1}{2\pi\sigma^2} \exp\left\{-\frac{x'^2 + y'^2}{2\sigma^2}\right\} \cos(2\pi\omega x') \quad (9)$$

where $(x', y')=(x \cos \theta + y \sin \theta, -x \sin \theta + y \cos \theta)$. In other words, $(x', y')$ is the $\theta$ rotation of $(x, y)$. And at reference character 23, local energy is calculated from the information at the different scales.

At reference characters 24 and 25, noise variance and mean of the local energy is estimated, and a noise threshold is applied on the local energy. Considering first the noise threshold, the filter response will be decreased by the noise threshold to remove the components considered as noise. However, finding the right threshold can be difficult. The expected response of the Gabor filters to a pure noise signal must first be examined. If the noise is supposed to be Gaussian, the complex response will have a 2-D Gaussian distribution. And the magnitude will be a Rayleigh distribution as:

$$R(x) = \frac{x}{\sigma_g^2} e^{\frac{-x^2}{2\sigma_g^2}} \quad (10)$$

where $\sigma_g^2$ is the variance of the 2-D Gaussian distribution. The mean and variance of the Rayleigh distribution are given by:

$$\mu_r = \sigma_g \sqrt{\frac{\pi}{2}} \text{ and } \sigma_r^2 = \frac{4-\pi}{2}\sigma_g^2 \quad (11)$$

The noise threshold can be set to some number of standard deviation beyond the mean of the distribution as in $T=\mu+k\sigma_r$.

Additionally, the noise amplitude distribution must be determined. The median value is considered as a statistically robust estimation of the mean. The smallest scale of the Gabor filter is used because the noise should be the most present at this scale. The median of a Rayleigh distribution is the value x such that $$\int_0^x \frac{x}{\sigma_g^2} e^{\frac{-x^2}{2\sigma_r^2}} = \frac{1}{2} \quad (12)$$

that leads to $$\text{median} = \sigma_g \sqrt{-2\ln(1/2)} \quad (13)$$

The mean of the Rayleigh distribution being $\sigma_g \sqrt{\pi/2}$, one gets the estimated mean of the amplitude response at smallest scale by a simple proportionality $$\text{mean} = \frac{\sigma_g \sqrt{\pi/2}}{\sigma_g \sqrt{-2\ln(1/2)}} \cdot \text{median} \quad (14)$$

Assuming that noise has a uniform repartition among frequency, the noise threshold at larger scales can be deduced by the threshold at the smallest scale since the noise amplitude response will be proportional to the bandwidth, itself related to the scale. It is notable that while the noise reduction process is described as executed in the edge detection stage 12', it is appreciated that noise reduction may be performed as a pre-processing step prior to edge detection.

Figure 6:
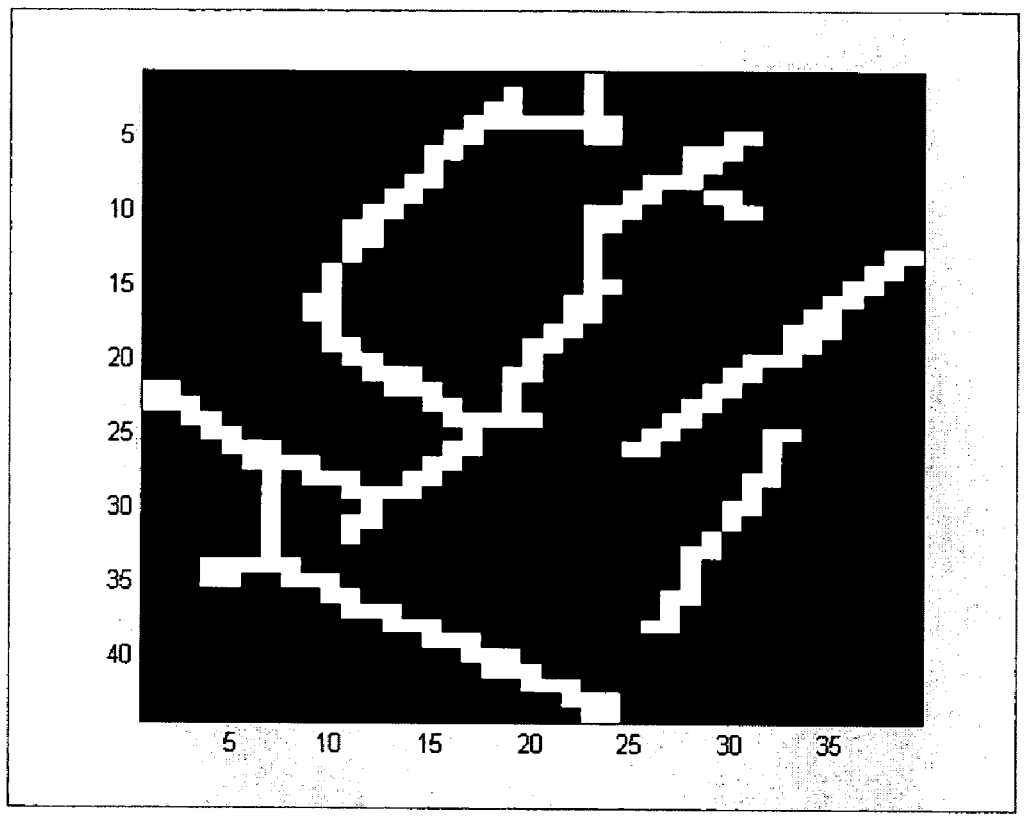
FIG. 6 is a screen shot of a sample edge map produced from the edge detection step of the present invention.

At reference character 26, local energy from each orientation is summed together, and the magnitude from each orientation is summed together at 27. The summations provide the values necessary to solve Equation (8) above. In particular, by dividing local energy by the magnitude, as indicated at reference character 28, the phase congruency function is obtained. Furthermore, at reference character 29, local maxima of the phase-congruency-based function (either PC(x) or LE(x)) is identified to detect corresponding edges. In this manner an edge map may be constructed as shown in FIG. 6, for example, with local maxima occurring at step edges of both parity (up or down), lines and bar edges, and other types of features such as the illusion patterns.

Figure 3:
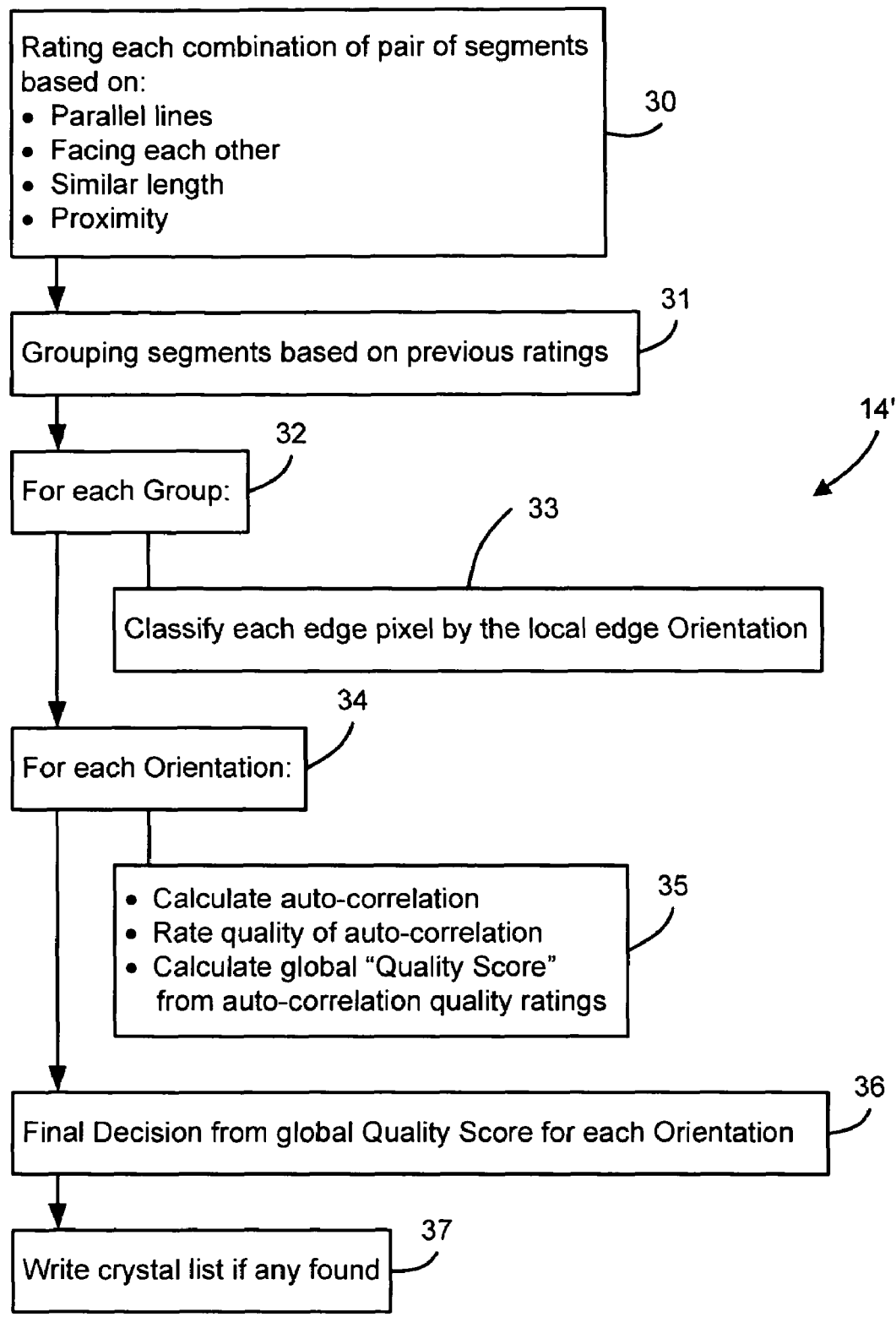
FIG. 3 is a flow diagram detailing an exemplary geometric analysis/evaluation process which evaluates the geometric relationships that the line segments have with each other to identify any crystal-like qualities.
Figure 7:
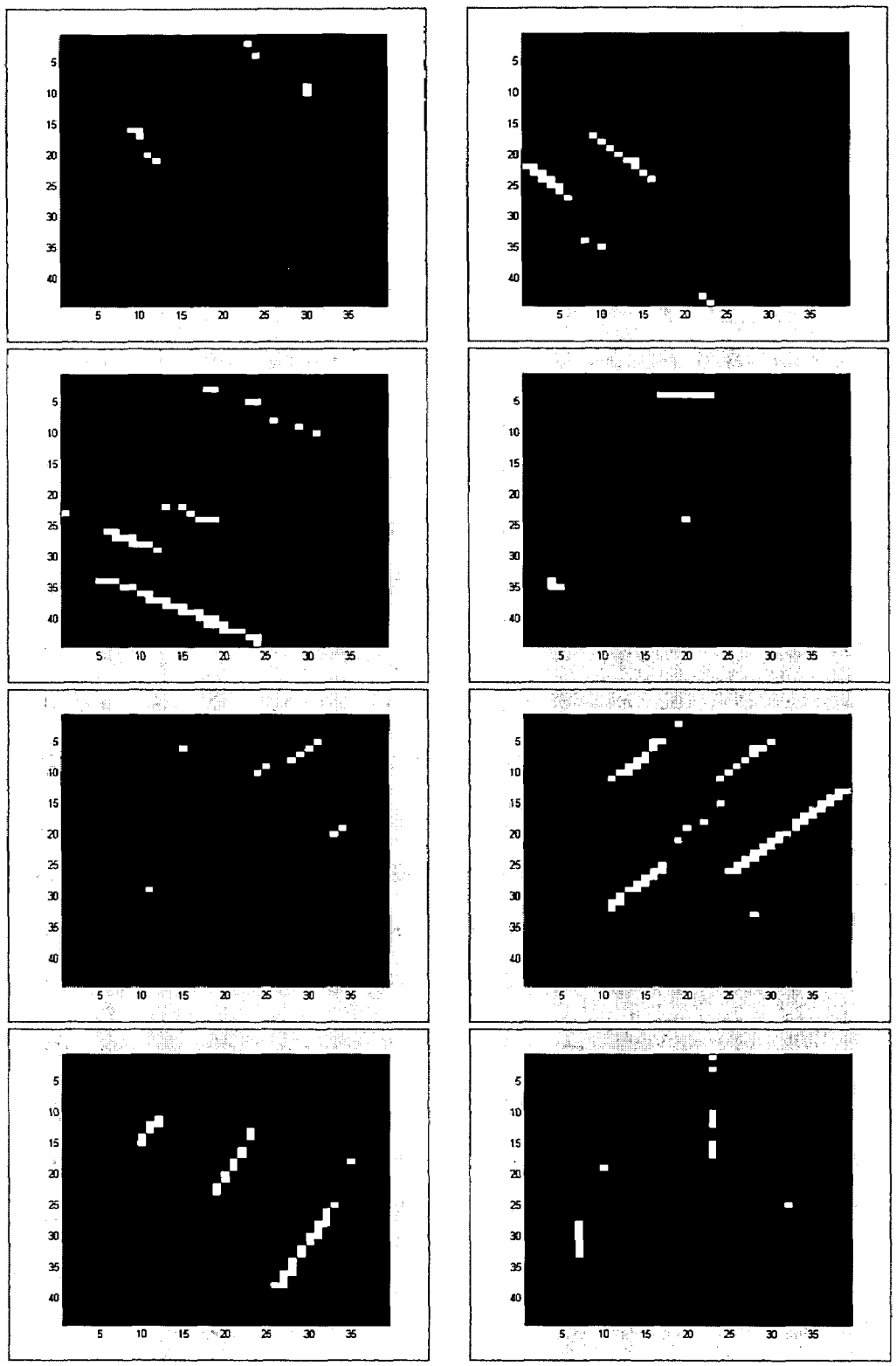
FIG. 7 is a multiple screen shot of the sample edge map of FIG. 5, separated into several images with each containing features having a given orientation.
Figure 8:
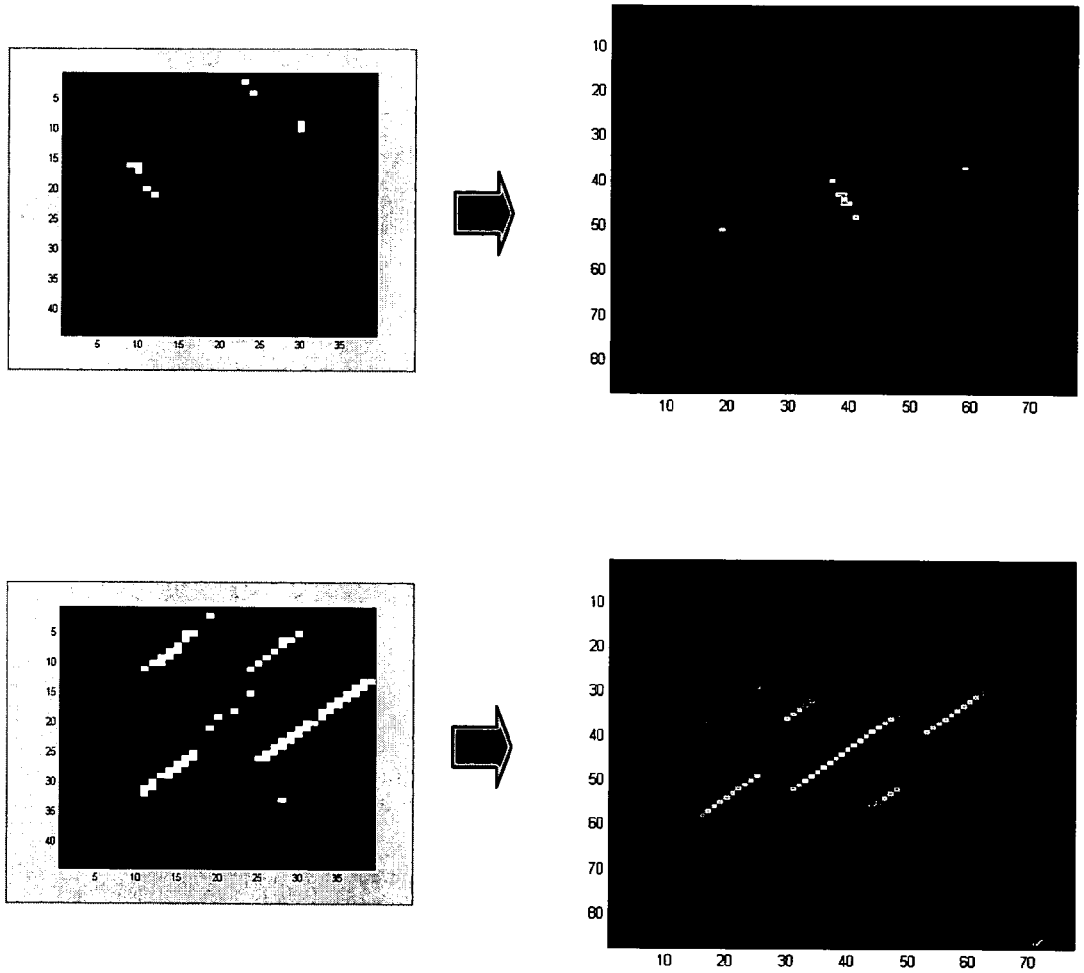
FIG. 8 is a multiple screen shot showing two orientations before and after auto-correlation is performed.

FIG. 3 shows a flow diagram of a preferred geometry analysis and evaluation process, generally indicated at reference character 14'. As discussed with respect to FIG. 1, the geometric evaluation stage at 14 occurs subsequent to the segmentation 13 of the detected edges into discrete line segments, and evaluates the geometric relationships that the line segments have with each other to identify crystal-like qualities. As indicated at 30, each combination of pairs of segments are first rated based on characteristically crystal-like qualities, including, but not limited to: parallel lines, facing each other, similarity in length, and relative proximity to each other. Next at 31, the line segments are grouped based on the preceding crystal-like quality ratings. For each group at 32, each edge pixel is classified according to the local edge orientation at 33. For example, FIG. 7 shows a multiple screen shot view of the edge map of FIG. 5 separated into eight images, with each image containing features having a given orientation. For each orientation at 34, auto-correlation is calculated to enhance shapes with parallel lines, and subsequently analyzed at 35 to decide if the shape is a crystal or not. FIG. 8 illustrates two orientations before (left column) and after (right column) auto-correlation is performed, showing the enhancements. Additionally at 35 the quality of the auto-correlation is rated using the following criteria: numbers of features in the auto-correlation above specific threshold, and length and location of these features. A global "quality score" is then calculated from the auto-correlation quality ratings. At 36 a final decision is made from the global quality score for each orientation as to whether a crystal has or has not been detected. Both statistical analysis and neural networks are used for this purpose. Depending on such determination that a crystal has in fact been detected, the results are written to a crystal list at 37, which may subsequently be viewed or otherwise reported to a researcher, scientist, or operator, or stored for later retrieval. The process may also be augmented by ranking the images according to crystal quality as determined from the aforementioned steps.

Additionally, the geometry analysis and evaluation stage may also be performed using additional criteria, including: (1) minimum gradient along edges, and (2) central symmetry. With respect to the first additional criteria, and for a given edge, the gradient (i.e. first derivative of the original picture) for each pixel overlapping this edge is summed together. If this sum is above a specific gradient, the edge is then considered relevant. With respect to the second criteria, symmetry centers are found using the phase information. An important aspect of symmetry is the periodicity that it implies in the structure of the object. To determine the centers of symmetry, the picture is filtered with the same pair of even and odd symmetric Gabor filters as for the edge detection technique. At a point of symmetry, the absolute value of the even filter will be large, and the absolute value of the odd one will be small. Taking the difference of the absolute value of the even-symmetric filter and the odd one give a quantification of the degree of symmetry in an object.

Figure 4:
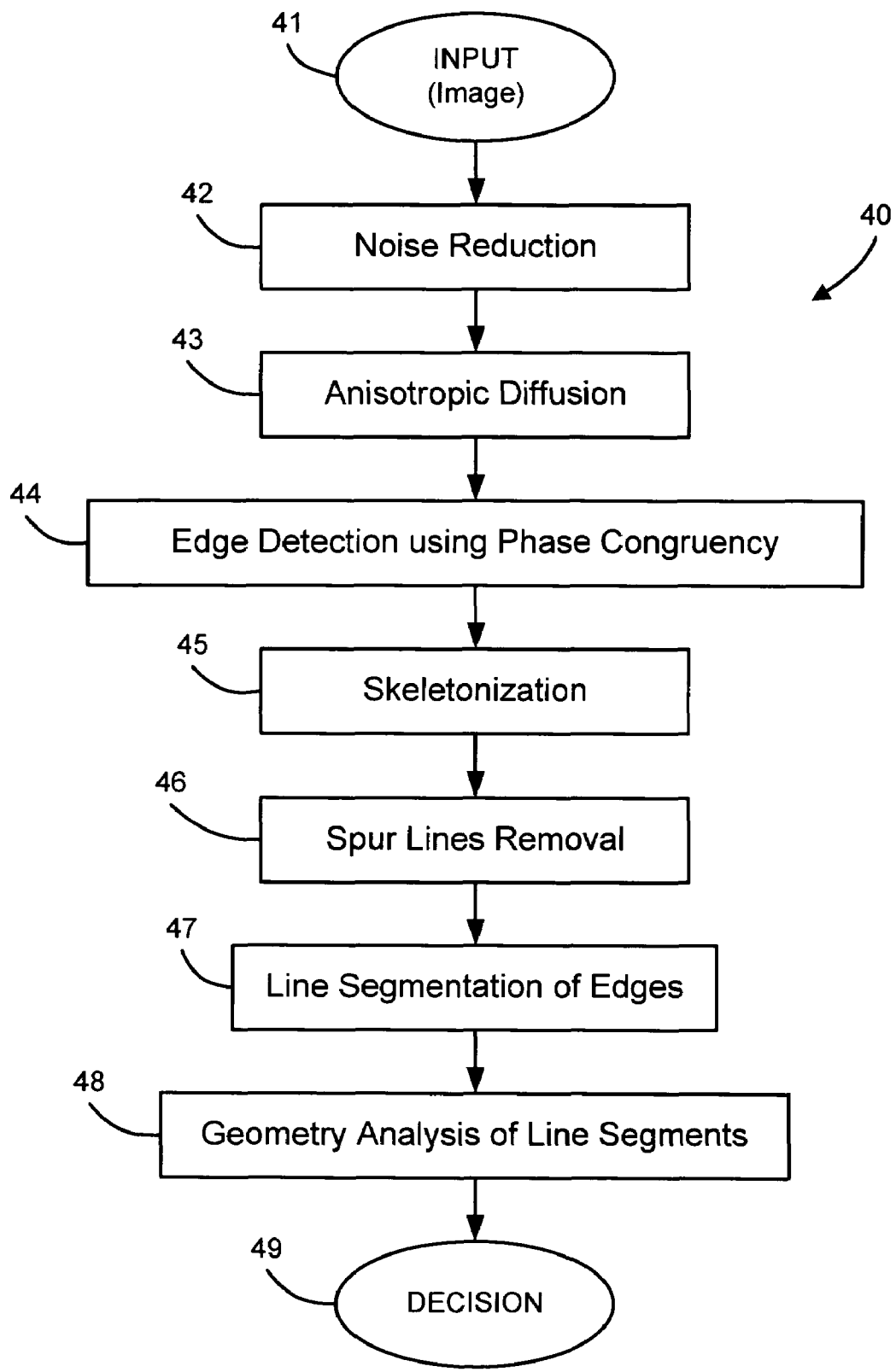
FIG. 4 is a flow diagram of a second exemplary embodiment of the present invention.

A flow diagram of an exemplary second embodiment is also shown in FIG. 4. Similar to the general algorithm of FIG. 1, the process here also begins with the input of images at 41, captured from, for example, crystallography experiments. Steps 42 and 43 illustrate optional pre-processing functions available for improving the crystal detection process. At 42, noise reduction is performed as a pre-processing step, similar to that previously discussed. Additionally, at step 43, a smoothing filter is employed, such as that performing nonlinear anisotropic diffusion, to clean the image prior to edge detection. Nonlinear anisotropic diffusion filters are commonly known and used for image enhancement while preserving edges. In particular, the filter performs intraregion smoothing while inhibiting interregion smoothing. It is notable also that image cleaning by smoothing step may be alternatively employed following the edge detection process, to clean and smooth the edge map of an image (not shown). At 44 edge detection is performed according to the process previously described, using a phase congruency-related function, such as either PC(x) or LE(x).

Next at 45 a skeletonization step extracts the skeleton of the acquired edge map by removing the non-maximal values of the edge map without breaking the object topology. This is accomplished by setting the non-maximal values to zero in the perpendicular direction (orientation) to the edge. While crystals generally have straight edges, the phase congruency-based edge detection discussed previously finds any kind of edge, not necessarily only straight ones. A line can be distinguished from other objects because the local energy in its perpendicular direction is high, and low in the parallel direction of the line. It is notable that a spot feature has the same local energy for all the orientations. This information is used to remove all the edges that are not line features. Additionally at 46 spur lines may also be removed from the skeleton structure obtained, as a post-edge detection image-cleaning step. In any case, the detected edges are then segmented into discrete, straight line segments in the line segmentation step of 47, followed by a geometric analysis and evaluation at 48, utilizing evaluation criteria characteristic of crystals as previously described. And finally at 49, a determination and decision is made based on the preceding geometric evaluation, as to whether crystals are present in a particular image. It is notable that a second edge detection (not shown) may be optionally utilized in conjunction with the first edge detection process described above, in order to further refine or otherwise limit the edge detection results obtained from the first edge detection.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A method of detecting macromolecular crystals in images comprising:
   detecting edges in said images by identifying local maxima of a phase congruency-related function associated with each image;
   segmenting the detected edges into discrete line segments;
   evaluating the geometric relationships that the line segments have with each other to identify any crystal-like qualities; and
   determining the presence of crystals in each image based on said evaluation.

2. The method of claim 1,
   wherein the crystal-like qualities include at least one of parallel lines, facing each other, similarity in length, and relative proximity.

3. The method of claim 1,
   wherein said evaluation includes rating pairs of line segments based on the respective crystal-like qualities thereof.

4. The method of claim 3,
   wherein said evaluation includes grouping the line segments based on the crystal-like quality ratings of each combination of pairs of line segments.

5. The method of claim 4,
   wherein said evaluation includes, for each group, classifying each edge pixel by a local edge orientation.

6. The method of claim 5,
   wherein said evaluation includes, for each orientation, calculating auto-correlation, rating the quality of the auto-correlation, and calculating a global quality score from the auto-correlation quality rating.

7. The method of claim 6,
   wherein the quality of the auto-correlation is rated according to the number of features in the auto-correlation above a predetermined threshold, and length and location of said features.

8. The method of claim 7,
   wherein the determination of the presence of crystals in each image is based on the global quality score for each orientation.

9. The method of claim 1,
   wherein the phase congruency-related function is the phase congruency function itself.

10. The method of claim 1,
    wherein the phase congruency-related function is a local energy function.

11. The method of claim 10,
    further comprising reducing noise by applying a noise threshold on the local energy function.

12. The method of claim 1,
    further comprising producing a skeletonal structure from the detected edges by removing non-maximal values of the edges.

13. The method of claim 1,
    further comprising removing spur lines from the detected edges.

14. The method of claim 1,
    further comprising smoothing the image prior to edge detection.

15. The method of claim 14,
    wherein anisotropic diffusion is used for smoothing.

16. A computerized system for detecting macromolecular crystals from images comprising:
    a digital conversion component that converts said light microscopy images into corresponding phase-based digital image data using the Fourier transform;
    an edge detection component that detects edges from the image data by computing local maxima of a phase congruency-related function associated with each image;
    a segmentation component that divides the detected edges into discrete line segments; and
    a geometric analyzer component that evaluates the geometric relationships that the line segments have with each other to identify any crystal-like qualities, and determines whether crystals are present in each image based on said evaluation.

17. The computerized system of claim 16, wherein the crystal-like qualities include at least one of parallel lines, facing each other, similarity in length, and relative proximity.

18. The computerized system of claim 16, wherein said geometric analyzer rates pairs of line segments based on the respective crystal-like qualities thereof.

19. The computerized system of claim 18, wherein said geometric analyzer groups the line segments based on the crystal-like quality ratings of each combination of pairs of line segments.

20. The computerized system of claim 19, wherein for each group, said geometric analyzer classifies each edge pixel by a local edge orientation.

21. The computerized system of claim 20, wherein for each orientation, said geometric analyzer calculates auto-correlation, rates the quality of the auto-correlation, and calculates a global quality score from the auto-correlation quality rating.

22. The computerized system of claim 21, wherein the quality of the auto-correlation is rated according to the number of features in the auto-correlation above a predetermined threshold, and length and location of said features.

23. The computerized system of claim 22, wherein said geometric analyzer determines the presence of crystals in each image based on the global quality score for each orientation.

24. The computerized system of claim 16, wherein the phase congruency-related function is the phase congruency function itself.

25. The computerized system of claim 16, wherein the phase congruency-related function is a local energy function.

26. The computerized system of claim 25, further comprising a noise reduction component that applies a noise threshold on the local energy function.

27. The computerized system of claim 16, further comprising producing a skeletonal structure from the detected edges by removing non-maximal values of the edges.

28. The computerized system of claim 16, further comprising a spur removal component for removing spur lines from the detected edges.

29. The computerized system of claim 16, further comprising a smoothing component for smoothing the image prior to edge detection.

30. The computerized system of claim 29, wherein the smoothing component utilizes anisotropic diffusion.

31. A computerized system for detecting macromolecular crystals from images comprising:
means for digitally converting said images into corresponding phase-based digital image data using the Fourier transform;
means for detecting edges from the image data by computing local maxima of a phase congruency-related function associated with each image;
means for dividing the detected edges into discrete line segments;
means for evaluating the geometric relationships that the line segments have with each other to identify any crystal-like qualities; and
means for determining the presence of crystals in an image from said evaluation.

32. A computer program product comprising:
a computer readable medium having a computer readable code embodied therein for causing the detection of macromolecular crystals in images, said computer program product having:
computer readable program code means for causing a computer to detect edges in said images by identifying local maxima of a phase congruency-related function associated with each image;
computer readable program code means for causing said computer to segment the detected edges into discrete line segments;
computer readable program code means for causing said computer to evaluate the geometric relationships that the line segments have with each other to identify any crystal-like qualities; and
computer readable program code means for causing said computer to determine the presence of crystals in each image based on said evaluation.

33. An article of manufacture comprising:
a computer readable medium having a computer readable code means embodied therein for causing the detection of macromolecular crystals in images, said computer readable code means in said article of manufacture comprising:
computer readable program code means for causing a computer to detect edges in said images by identifying local maxima of a phase congruency-related function associated with each image;
computer readable program code means for causing said computer to segment the detected edges into discrete line segments;
computer readable program code means for causing said computer to evaluate the geometric relationships that the line segments have with each other to identify any crystal-like qualities; and
computer readable program code means for causing said computer to determine the presence of crystals in each image based on said evaluation.

34. A program storage device readable by a computer, tangibly embodying a program of instructions executable by the computer to perform method steps for detecting macromolecular crystals from images, said method steps comprising:
detecting edges in said images by identifying local maxima of a phase congruency-related function associated with each image;
segmenting the detected edges into discrete line segments;
evaluating the geometric relationships that the line segments have with each other to identify any crystal-like qualities; and
determining the presence of crystals in each image based on said evaluation.

* * * * *